United States Patent [19]
Maier et al.

[11] Patent Number: 5,825,554
[45] Date of Patent: Oct. 20, 1998

[54] LENSES WITH A VARIABLE REFRACTION INDEX

[75] Inventors: Gerhard Maier, Dauchingen, Germany; David Harrison, Strasbourg, France; Masahiro Fujimoto, Kawasaki, Japan

[73] Assignee: Thomson Consumer Electronics, S.A., Courbevoie, France

[21] Appl. No.: 173,018

[22] Filed: Dec. 3, 1993

Related U.S. Application Data

[63] Continuation of PCT/EP92/01168, May 25, 1992.

[51] Int. Cl.[6] .................................................. G02B 3/00

[52] U.S. Cl. ............................................................ 359/652

[58] Field of Search ................................. 359/652, 653, 359/654

[56] References Cited

U.S. PATENT DOCUMENTS

| | | | |
|---|---|---|---|
| 2,761,141 | 8/1956 | Strandberg | 343/911 |
| 3,133,285 | 5/1964 | Jordan | 343/911 |
| 3,470,561 | 9/1969 | Horst | 343/911 |
| 4,422,733 | 12/1983 | Kikuchi et al. | 359/652 |
| 4,557,566 | 12/1985 | Kikuchi et al. | 359/652 |

*Primary Examiner*—Scott J. Sugarman
*Attorney, Agent, or Firm*—Joseph S. Tripoli; Frederick A. Wein

[57] ABSTRACT

A lens having a variable index of refraction and a point of symmetry is fabricated from a plurality of substantially identically shaped parts. Each of the parts is pyramidal in configuration and has a base and a plurality of sides extending from the base to an apex. Each of the parts has a coefficient of refraction which varies from the base to the apex.

9 Claims, 2 Drawing Sheets

LENSES WITH A VARIABLE REFRACTION INDEX

BACKGROUND OF THE INVENTION

This is a continuation of PCT application PCT/EP 92/01168 filed May 25, 1992 by David Harrison, Masahiro Fujimoto and Gerhard Maier and titled "Process For The Production Of Lenses With A Variable Refraction Index."

This invention is related to a lens with a variable index of refraction, e.g., a Luneburg-type lens, which might be used as part of a microwave antenna system, and an appropriate process for the production of such a lens.

It is known, e.g., from U.S. Pat. No. 4,288,337, that such lenses can be used as radar reflectors or, as is know from E. F. Buckley; "STEPPED-INDEX LUNEBURG LENSES"; Electronic Design, Apr. 13, 1960, as part of an antenna system. As described by Buckely in said article, a known process for producing Luneburg lenses uses a hemisperical shell construction with a given number of layers.

According to U.S. Pat. No. 4,288,337, the layers for the fabrication of Luneburg and Eaton-Lippmann lenses for microwave applications can be produced by dielectrics. In such cases the relation between the relative dielectric constant E and the refraction index n is $$n = E^{1/2}. \tag{1}$$

A mixed dielectric can be obtained by mixing expanded particles selected from the group consisting of expanded polystorols, expanded polyethylenes, expanded polyurethanes, glass balloons and silica balloons, with metal-coated particles consisting of said expanded particles, surfaces of which have been coated with a thin film selected from the group of chromium, aluminium, copper, nickel, gold, silver and magnesium in proper proportions to obtain a desired dielectric constant then forming the same to the desired shape by the use of a binder.

As described by M. A. Mitchel et al. in the article "A Multiple-Beam Multiple-Frequency Spherical Lens Antenna System Providing Hemispherical Coverage"; 6. Int. Conference on Antennas and Propagation (ICAP), 1989, Part 1; pp. 394–398, for a dielectric material, such as polystyrene, the relation between its relative dielectric constant E and its density d may be expressed by $$E = 0.4 * E_0^{(d/do)} + 0.6 * (1 + E_0 - P(d/do)), \tag{2}$$

where $E_0$ is the relative dielectric constant of the expanded dielectric material, and do is the density of the unexpanded dielectric material.

Using the relation (2), Mitchel et al. produced shells for a shell-construction of a Luneburg lens.

By the mentioned methods for the fabrication of lenses it is just possible to approximate the variation of the refraction index required, which is dependent on the dielectric constant. No practical scheme for smoothly varying the refractive index has been achieved.

By using shells with different dielectric constants and thereby with different refraction indexes, reflection losses occur, by which power is reflected from the dielectric boundaries.

In U.S. Pat. No. 3,470,561, which presents a spherical Luneburg lens, is mentioned that the variation of the refraction index n as a function of polystyrene density d (in lbs./cu.ft.) is given by $$n = (1 + 0.02d)^{0.5}.$$

Another method for the variation of the refraction index n, which is presented by U.S. Pat. No. 3,470,561, is achieved by means of a variably loaded artificial dielectric medium. There it is also mentioned to fabricate a plurality of substantially identical orange-slice shaped wedges which collectively form the Luneburg lens to be produced. The fabrication of said orange-slice shaped wedges is quite costly.

SUMMARY OF THE INVENTION

It is an object of the invention, to present a lens with a given variable refraction index, which allows a more accurate representation of the required profile of the refraction index by using parts, which can be easily produced.

The present inventive lens has a symmetry point and a variable refraction index n, and is made up of a number of parts, each of which has a given variation in the index of refraction n in such a manner, that the lens produced has a given variable index of refraction. The shapes of the parts collectively form the shape of the lens. It is preferred that most of the parts have the same shape, which is pyramid-like.

The kind of the symmetry point depends on the shape of the lens to be produced. When the lens is spherical, the symmetry point can coincide with the center point of the sphere. When the lens is hemispherical, the symmetry point can be the center point of the sphere which would result by combining the hemispherical lenses. For a cylindrical lens the symmetry "point" may be the center line of the cylinder.

The invention has the advantage, that the aperture efficiency of an antenna system, including the lens to be produced, is increased compared to the use of a shell-type lens. This is achieved by avoiding or reducing power reflections from dielectric boundaries, which normally occur at shell interfaces. It is another advantage of the invention, that phase of colliminated rays at feed points of an antenna system is more exact, whereby aperture efficiency can be increased.

By avoiding or reducing electromagnetic fields inside the lens, which are caused to propagate tangentially to shell surfaces causing surface waves to be set up, aperture efficiency can also be increased.

The use of identical parts, e.g., pyramid-like shaped, each of which has an apex arranged in the proximity of a symmetry point of the lens being fabricated and a plurality of edges extending from the symmetry point to the outer surface of the lens whereby the bases of the pyramid-like parts form the outer surface of the lens, advantageous in that an identical process is used to produce all the parts which collectively form the lens.

By using a symmetrical part, which may be built of sub-parts, and which is located at the symmetry point of the lens being fabricated, the pyramid-like parts which radiate from the outer surface of the symmetrical need not have a sharp angle at the apex.

BRIEF DESCRIPTION OF THE DRAWINGS

The present invention is described with reference to the accompanying drawings, wherein.

DESCRIPTION OF THE PREFERRED EMBODIMENTS

In the following description means and details with the same function or meaning which are used in several figures have the same reference numbers and if they are explained once, they will only be explained in the further description as far as it is necessary for the understanding of the present invention.

Figure 1:
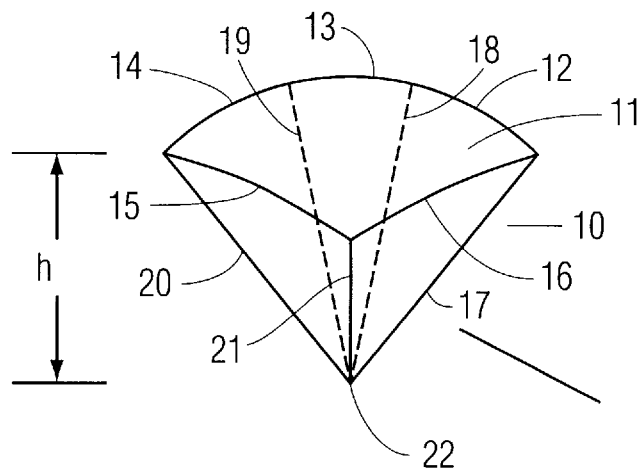
FIG. 1 is a preferred embodiment of a pyramid-shaped part, which is used to produce the inventive lens.

According to the first embodiment of the invention, parts like the one 10 shown in FIG. 1 are used. Several of the parts 10 collectively form a lens. The base 11 of the part 10 has five edges 12 to 16 and can be flat or rounded. Other edges 17 to 21 extend from the base 11 to the apex 22 of the pyramid shaped part 10. The height h of the part 10 is the shortest distance between the base 11 and the apex 22.

Figure 2:
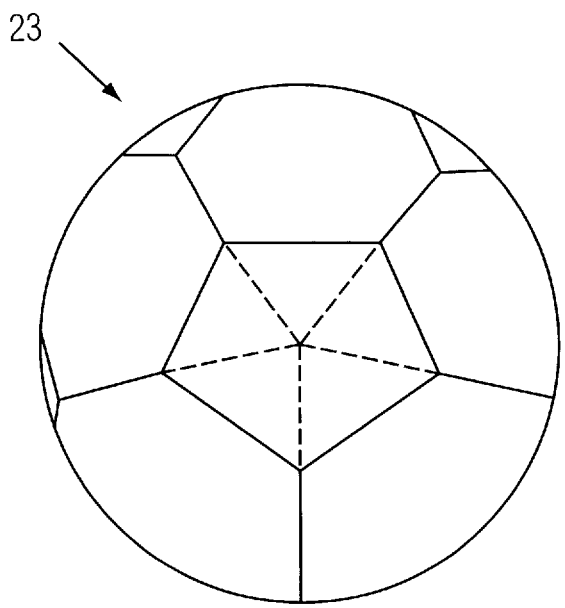
FIG. 2 shows a lens constructed of the preferred embodiment shown in FIG. 1.
Figure 3:
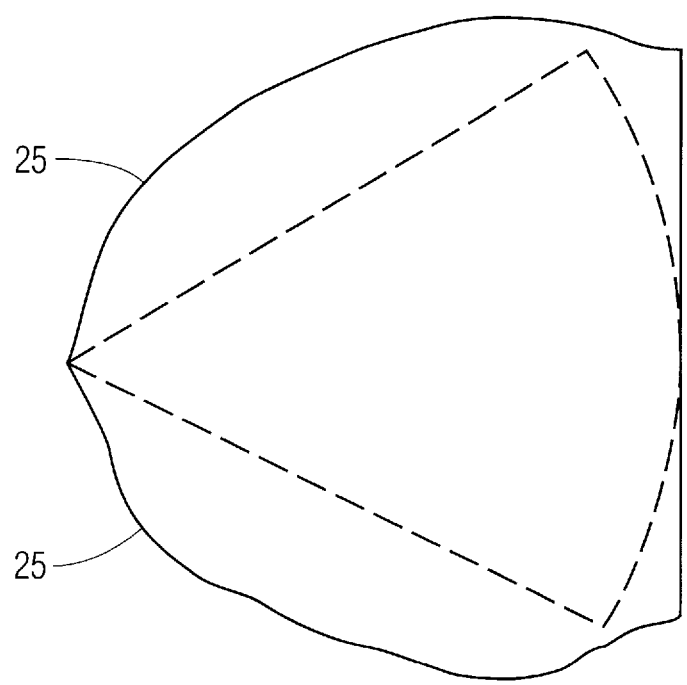
FIG. 3 shows, in principle, a preferred process for producing the part shown in FIG. 1.

FIG. 2 shows a lens 23 produced by a number of the parts 10, all of which have the same shape and are of the same composition. Although only six identical pyramid-shaped parts can be seen, it takes twelve of the parts to form the spherical lens 23 shown in FIG. 2. In this embodiment the apexes 22 of the twelve parts meet at the symmetry point of the lens 23. The bases 11 of the twelve parts collectively form the outer surface of the lens 23.

In the further description, a production process for the part 10 is, in principle, described. The twelve parts, which collectively form the lens 23, are identical and therefore the same process can be used to form all parts of the lens.

The material used to fabricate the part 10 is a dielectric, such as polysterene, and in such case the relationship between the refraction index n and the dielectric constant E is according to formula (1).

The refraction index n(r) and the relative dielectric constant E(r) vary for a Luneburg lens, having not shown focal points at its outer surface for parallel waves, with radius according to $$n(r)=(1-(r/r_o)^2)^{0.5}, \quad (3a)$$

$$E(r)=1-(r/r_o)^2 \quad (3b)$$

where r is the actual radius and $r_o$ is the radius of the spherical lens 23.

The shape of the part 10, in this embodiment pyramid-like, may be formed by compressing the expanded dielectric material, such as polysterene, at an elevated temperature. To achieve the necessary dielectric constant variation along the height h, a greater amount of forming pressure would be applied at the apex 22 than at the base 11 of the part 10. As the dependence of the relative dielectric constant E with density may be expressed by formula (2), an uncompressed shape 25 may be achieved, e.g., by shaping or cutting.

Figure 4:
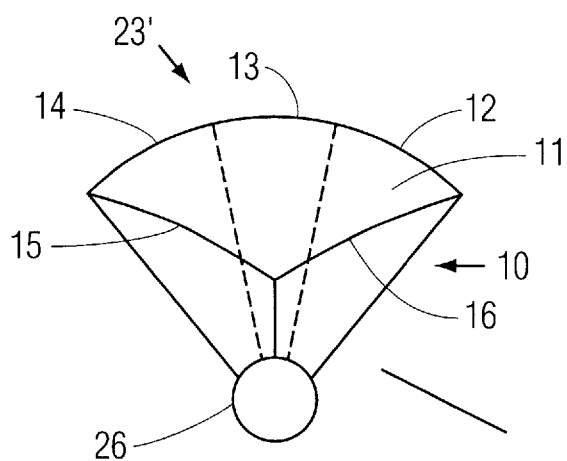
FIG. 4 shows, in principle, another preferred method of producing the inventive lens.

Another preferred embodiment of a lens 23' is shown in FIG. 4. Differently shaped parts are used to build the lens 23.

A spherical center part 26, which may be made of sub-parts, is arranged with its center point coincident with the symmetry point 24. In this embodiment, twelve of the pyramid-shaped parts are needed. The presence of the spherical part 26 allows elimination of the sharp apex of the parts 20.

In the FIG. 4 embodiment, the center part 26 may have a homogeneous dielectric constant, e.g., in that case that the size of the center part 26 is so small, that a deviation of desired ray trajectories may be negligible. In another of the FIG. 4 embodiment, the center part 26 is not spherical in configuration. Instead it has flat surfaces equal in number to the number of parts 10 which form the lens.

It is also possible that some of the outer parts 10 have more or less pointed apexes and the rest of them have truncated apexes. In this case a center part used with an appropriate shape can be fixed more easily.

Versions of the preferred embodiments may contain at least one of the following variations:

By using appropriate pyramid-like shaped parts, like the part 10 or the truncated part 27 lenses with non-spherical shapes may be produced;

The realization of the profile of the refraction index n may be achieved by other processes, e.g., by doping, mixing or thermal processes, whereby metal-coated particles may be used;

The boundaries of the single parts 10, 26, 27 may be connected together or linked with each other, e.g., by an appropriate adhesive or melting process;

By using an appropriate material, the lens to be produced may be able to refract other electromagnetic waves, such as visible or infrared light;

The lens to be produced may have any desired relationship between the dielectric constant E or the index of refraction and the normalized radius $r/r_o$, e.g., in that way, that the focal point for parallel waves is inside or outside of the surface of the lens;

By using a material with an appropriate refraction index even lenses, which are able to refract any other waves, e.g., acoustic waves, may be produced;

Instead of the pyramid-like shaped parts 10 or 27 respectively, with a five-edge base, other pyramid-like shaped parts can be used, e.g., 36 of them with a three-edge base, to build a spherical lens;

For the construction of a needed lens, which is just a part of a spherical lens (hemispherical, quarterspherical, or the like), a spherical lens may be cut, whereby only one assembling process is necessary for the production of two or more needed lenses, or other kinds of parts can be used, which collectively form a non-spherical lens.

This invention presents a lens with a selected variable index of refraction by bringing together several parts, which themselves have preferably a variable index of refraction, and a process for producting the lens.

The realization of the desired refraction index of the parts can be achieved by compressing dielectric material of a first shape into its final shape or by mixing dielectric materials, which may be metal-coated.

Outer parts, which extend to the outer surface of the lens being produced, have a pyramid-like shape with a pointed or truncated apex respectively. In the first case the apexes of the outer parts meet in the symmetry point of said lens; in the latter case a center part is used which is located around said symmetry point.

It is also possible that some of the outer parts used have pointed apexes and the rest of them have truncated apexes. In this case a center part used is easy to fix near the symmetry point of the lens.

Compared with lenses, produced according to known processes, lenses produced by the inventive have on one hand the advantage that the aperture efficiency is increased by avoiding reflections from the dielectric boundaries and by avoiding electromagnetic fields inside the lens caused to propagate tangentially to the shell surfaces causing surface waves to be set up. Additionally, the phase of collimated rays at feed points is more exact, also leading to an increased aperture efficiency.

On the other hand, the parts that collectively form the lens can be produced easily.

If identical parts are used, the same process steps for their manufacturing can be used.

If dielectric material is taken, the lens to be produced can preferably be used as part of a microwave antenna system.

We claim:

1. A lens having a variable index of refraction and a point of symmetry comprising:

a plurality of substantially identically shaped parts, said parts collectively forming said lens, each of said parts being pyramidal in configuration and having a base and a plurality of sides extending from said base to an apex, and each of said parts having a coefficient of refraction which varies from said base to said apex.

2. The lens of claim 1 wherein the apex of each of said pyramidal parts is arranged in the proximity of said point of symmetry and wherein said bases form the outer surface of said lens.

3. The lens of claim 2 wherein said bases are curved.

4. The lens of claim 2 wherein bases are flat.

5. The lens of claim 3 wherein said pyramidial parts are pentagonal.

6. The lens of claim 4 wherein said pyramidial parts are pentagonal.

7. The lens of claim 2 wherein said lens is composed of twelve parts.

8. The lens of claim 2 wherein said lens is composed of twelve parts.

9. The lens of claim 1 further including a symmetrical part arranged coincident with said point of symmerty and wherein said pyramidal parts radiate from said symmetrical part.

* * * * *